United States Patent
Enokida (10) Patent No.: US 6,629,101 B1
(45) Date of Patent: Sep. 30, 2003

(54) DATA PROCESSING METHOD AND APPARATUS, AND STORAGE MEDIUM

(75) Inventor: Miyuki Enokida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 09/595,882

(22) Filed: Jun. 20, 2000

(30) Foreign Application Priority Data

Jul. 2, 1999 (JP) ............................................. 11-189636

(51) Int. Cl.$^7$ ............................................... G06F 17/30
(52) U.S. Cl. ....................................... 707/102; 707/100
(58) Field of Search ............................... 707/1, 10, 102, 707/500, 513, 100; 358/369, 365; 395/200.77

(56) References Cited

U.S. PATENT DOCUMENTS

| | | | | |
|---|---|---|---|---|
| 5,383,029 A | * | 1/1995 | Kojima | 358/403 |
| 5,386,297 A | * | 1/1995 | Tanaka et al. | 358/1.9 |
| 5,822,541 A | * | 10/1998 | Nonomura et al. | 395/200.77 |
| 5,832,471 A | * | 11/1998 | Fukui | 707/1 |
| 5,937,160 A | * | 8/1999 | Davis et al. | 707/10 |
| 6,173,287 B1 | * | 1/2001 | Eberman et al. | 707/102 |
| 6,272,484 B1 | * | 8/2001 | Martin et al. | 707/1 |
| 6,360,010 B1 | * | 3/2002 | Hu et al. | 358/464 |

* cited by examiner

*Primary Examiner*—Diane D. Mizrahi
(74) *Attorney, Agent, or Firm*—Fitzpatrick, Cella, Harper & Scinto (57) ABSTRACT

Binary data and meta-data to be attached to the binary data are read. When it is determined that the read meta-data is described in a valid XML, the meta-data is attached behind the read binary data. Then, the type of binary data is determined, and an appropriate end code is added to the end of the meta-data which is attached to the binary data. Then, the obtained data is outputted as a binary data file.

18 Claims, 10 Drawing Sheets

DATA PROCESSING METHOD AND APPARATUS, AND STORAGE MEDIUM

FIELD OF THE INVENTION

The present invention relates to a data processing method of binary data and meta-data, an apparatus therefor, and a storage medium.

BACKGROUND OF THE INVENTION

Meta-data is attached data related to data of interest, and is used for explaining binary data such as image data, audio data and so on. When binary data and corresponding meta-data exist in separate files, a user must manage both binary data and meta-data for moving or copying a file, which is an extremely cumbersome operation.

In view of this, to facilitate management of binary data and meta-data, various methods of describing binary data and meta-data have been proposed. The conventional methods can be classified into two methods: a method of designating a new binary format, and a method of managing the data in database.

Figure 9:
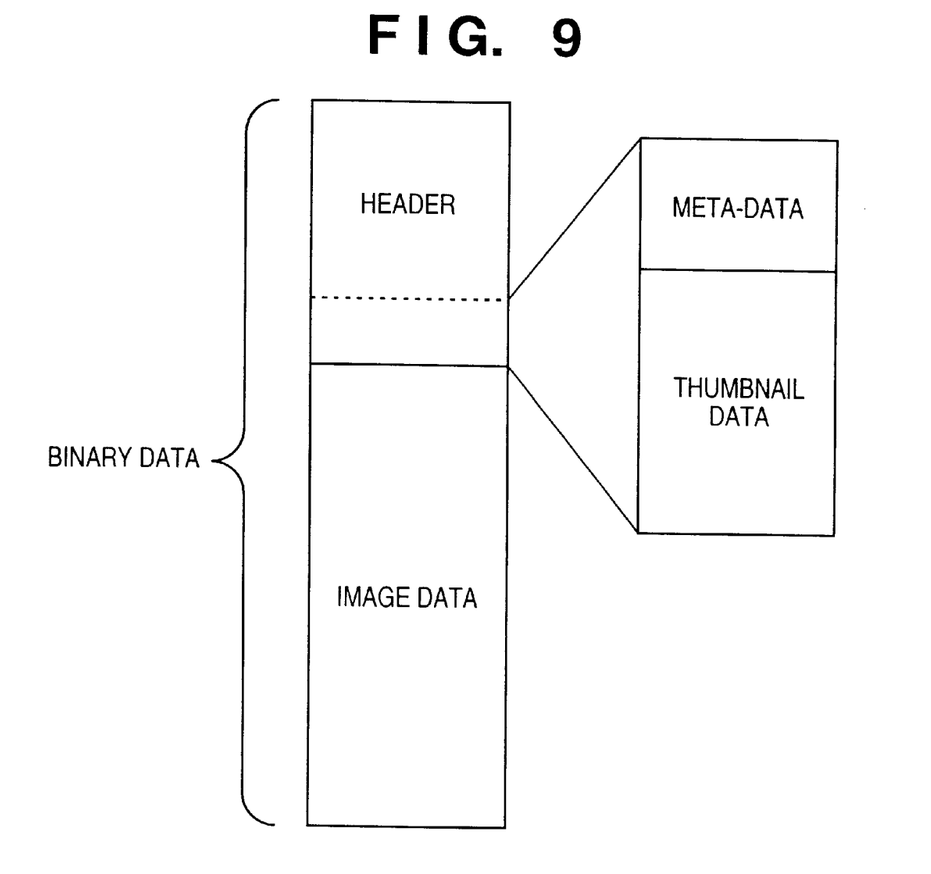
FIG. 9 shows a data format in which meta-data is embedded in binary data.

The method of designating a new binary format is exemplified by Tiff, Exif, Flashpix or the like for an image format. FIG. 9 shows a data format in which meta-data is embedded in binary data. The binary data is, for example, image data. As shown in FIG. 9, the method of designating a new binary format is generally realized by providing a frame for describing meta-data in the header of image data, thereby enabling a user to describe meta-data. By virtue of describing meta-data, data retrieval and data classification are facilitated. Furthermore, since meta-data is included in the binary data, these data can be managed as a single file, and file management becomes relatively easy.

Figure 10:
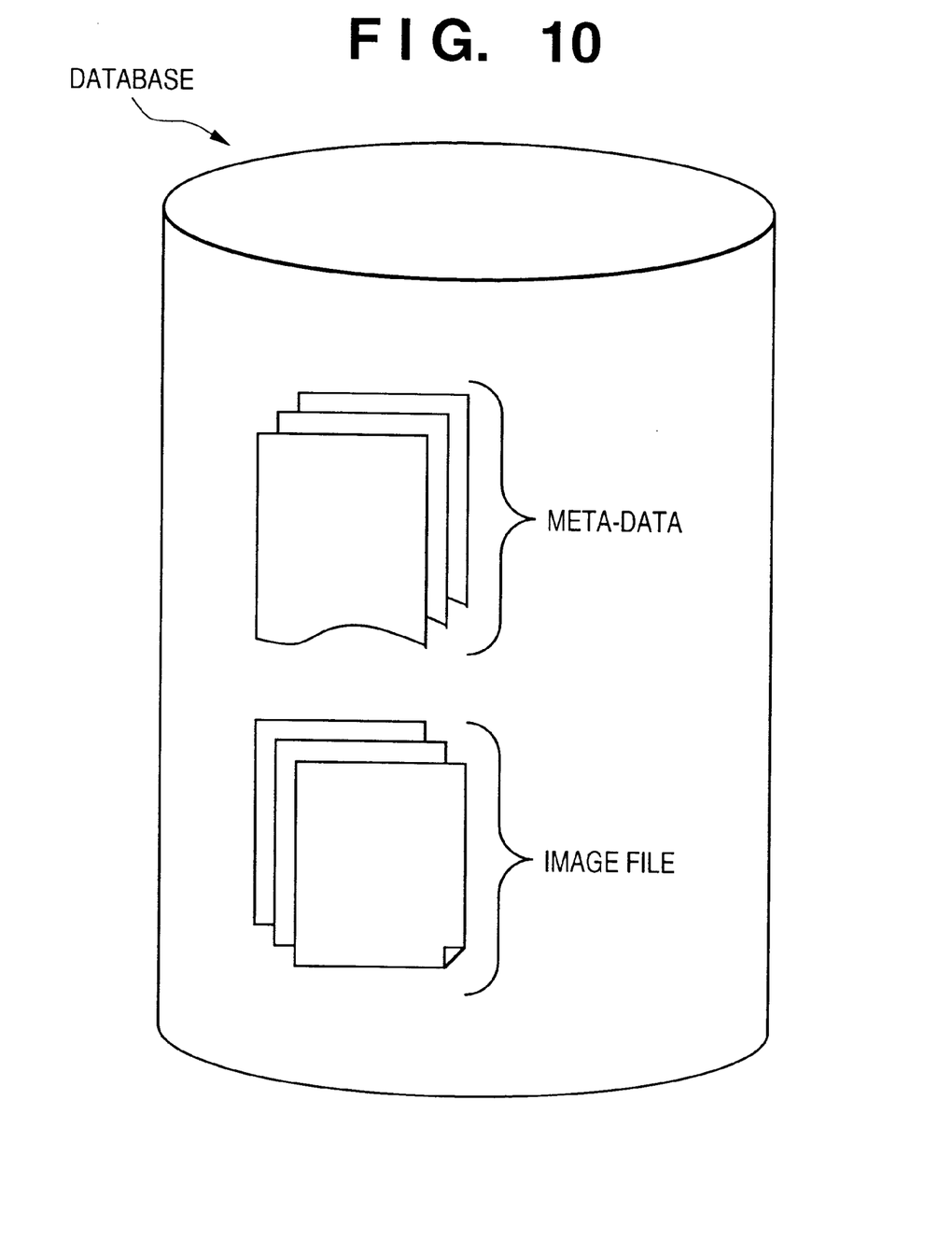
FIG. 10 is a conceptual view showing a method of managing binary data and meta-data in database.

Next, the method of managing binary data and meta-data in database is described. FIG. 10 is a conceptual view showing the method of managing binary data and meta-data in database. This method of managing binary data and meta-data in separate files by using database is also a widely known method. This method is advantageous since existing binary data can be used in an existing application program without modification.

However, the method of designating a new format for describing meta-data and the method of managing meta-data by using a database have the following problems.

When a new format for describing meta-data is designated, the existing binary data must be converted to the new format and meta-data must be described in the new format. Furthermore, to perform data retrieval using the meta-data in the new format, an application program for the new format is necessary. In other words, to describe and employ the meta-data in the new format, an extremely large number of steps must be taken and a dedicated environment is necessary. Furthermore, to process binary data in the new format (for instance, in case of outputting image data), an existing application program cannot be used so that an application program for the new format must be developed. In other words, a dedicated environment is necessary even for using the binary data.

In addition, since the description method of meta-data is uniquely determined by the new format, in order to develop an application program for the meta-data in the new format, a meta-data retrieval routine must be newly generated. Furthermore, to describe meta-data in a new frame, the format specification must also be changed.

Meanwhile, in a case where both binary data and meta-data are managed by using a database, meta-data cannot be registered or used without the use of database software. Furthermore, in order to display registered meta-data, dedicated software is necessary. Moreover, when binary data is moved outside the database, meta-data is not attached to the binary data, and as a result, binary data alone is moved from the database.

In addition, if data managing meta-data includes a reserved word specified in the binary-data format or a code indicative of special meaning, an existing application program may erroneously operate.

SUMMARY OF THE INVENTION

The present invention has been proposed to solve the conventional problems, and has as its object to enable registration of meta-data in binary data without influencing an existing application program.

Furthermore, another object of the present invention is to provide binary data, in which meta-data is registered, in the form processible by an existing application program.

Furthermore, another object of the present invention is to enable application of an existing data description language tool by using a general data description language for describing meta-data, thereby facilitating development of a corresponding application program.

Furthermore, another object of the present invention is to facilitate processing such as retrieval, reference, modification or the like, by extracting meta-data from binary data having meta-data.

Still further, another object of the present invention is to provide a method of easily determining binary data where meta-data is described.

In order to attain the above objects, the data processing method according to the present invention has the following steps. More specifically, the data processing method of registering meta-data in binary data, comprises: a first reading step of reading binary data to which meta-data is to be added; a second reading step of reading meta-data to be added to the binary data; a first attaching step of attaching the meta-data, read in the second reading step, behind the binary data read in the first reading step; a second attaching step of attaching an end code, corresponding to the binary data, behind the meta-data attached in the first attaching step; and an output step of outputting entire data, obtained by the first and second attaching steps, as a single file.

Furthermore, in order to attain the above objects, the data processing method according to the present invention has the following steps. More specifically, the method of determining meta-data with respect to binary data where meta-data is registered, comprises: a reading step of reading data; and a determination step of determining meta-data, included in the read data, by inspecting the data, read in the reading step, from the end of the data and determining whether or not an end code is followed by data described in an appropriate form of a predetermined data description language.

Furthermore, according to an aspect of the present invention, a data processing apparatus which realizes the aforementioned data processing method is provided. Still further, according to another aspect of the present invention, a storage medium storing a control program for having a computer realize the aforementioned data processing method is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

According to the first embodiment, binary data having meta-data is generated by attaching meta-data, described in a predetermined data description language (in the present embodiment, Extensible Markup Language (XML) is used), behind the binary data. At this stage, if the attached meta-data includes a reserved word specified in the binary-data format or a code indicative of special meaning, an existing application program may erroneously operate. Hereinafter, such case is described in detail, and then the data processing apparatus according to the first embodiment is described.

Figure 2:
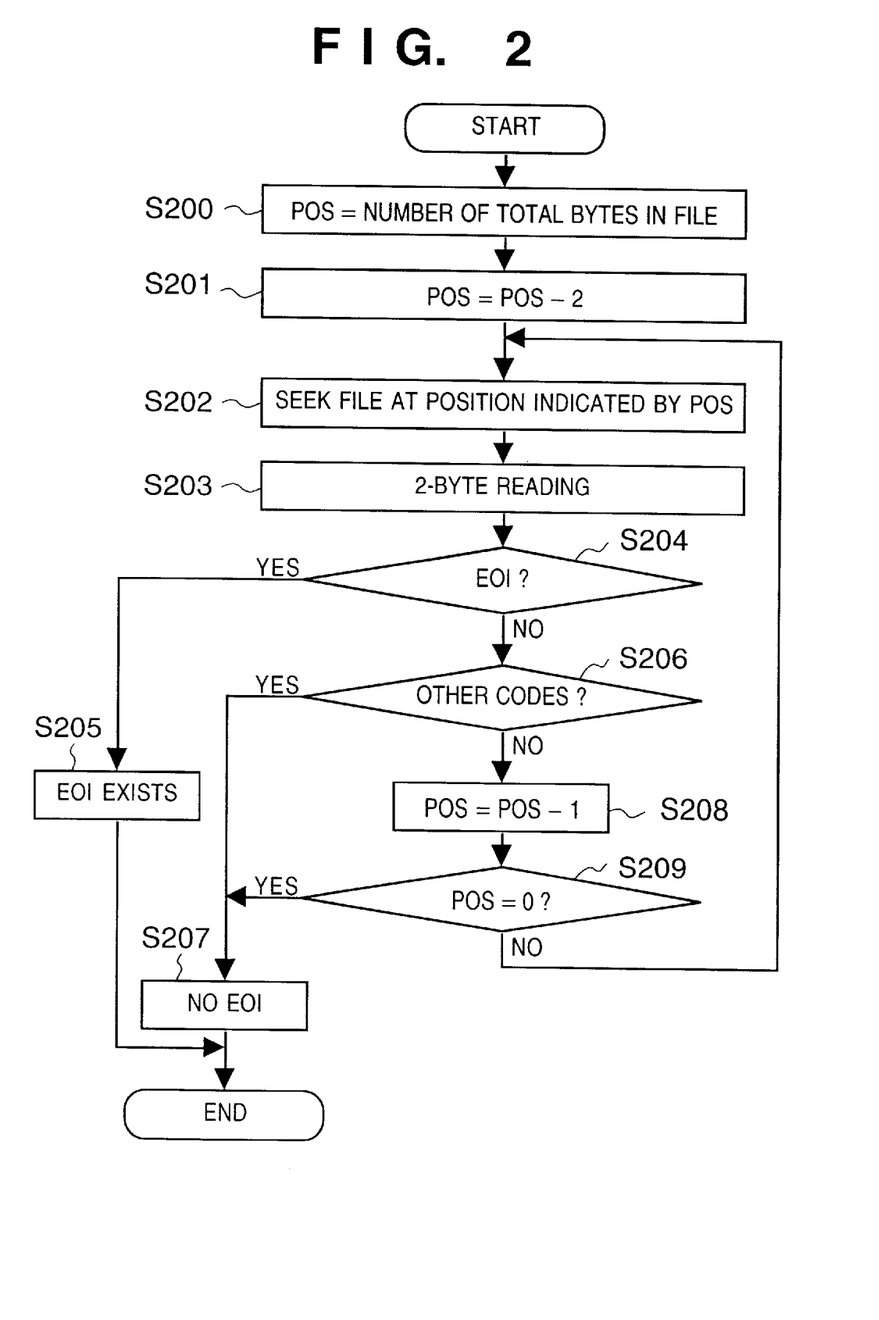
FIG. 2 is a flowchart showing steps of retrieving an End Of Image (EOI) marker code.

For instance, assuming a case where binary data is coded by the JPEG scheme and stored in a storage medium, there is a process of determining whether or not an End Of Image (EOI) code exists at the end of the file. FIG. 2 is a flowchart showing the steps of retrieving the EOI marker code.

Referring to FIG. 2, first in step S200, the number of bytes in a file of JPEG-coded data is set in a variable POS. In step S201, 2 is subtracted from the value of the variable POS. In step S202, the position of the variable POS is set as a file-read position and seeking is performed in the storage medium. In step S203, the file is read in unit of two bytes, thereby serially reading data from the end of the file in unit of two bytes.

In step S204, it is determined whether or not the read two-byte data is an EOI code. If so, the control proceeds to step S205 to decide an existence of EOI code. Meanwhile if it is determined in step S204 that the two-byte data is not an EOI code, the control proceeds to step S206. In step S206, it is determined whether or not the two-byte data is a marker code which possibly exists in the JPEG code data. If the two-byte data is determined as a marker code in step S206, the control proceeds to step S207 where it is decided that there is no EOI code in the JPEG file. Meanwhile in step S206, if it is determined that the two-byte data is not a marker code, the control proceeds to step S208. In step S208, 1 is subtracted from the current value of the variable POS. In step S209, it is determined whether or not the value of the variable POS is 0. If so, it means that data reading has reached the beginning of the file;

thus the control proceeds to step S207 where it is decided that there is no EOI marker code. If the value of the variable POS is not 0 in step S209, the control returns to step S202 for repeating the above-described processing.

By the above processing, it is possible to determine whether or not the JPEG file subjected to processing is a complete JPEG file (for instance, whether the codes are not cut off in the middle of the file). Accordingly, for instance, it is possible to not perform decoding on the JPEG file if the file does not have an EOI code.

In the above-described processing, if meta-data is attached behind the JPEG-coded data, the determination of an EOI code described in FIG. 2 may erroneously be made. Furthermore, when retrieving an EOI code from the end of the file as described in the above processing, the determination processing must be repeated for the codes corresponding to the amount of attached meta-data. This is disadvantageous since it requires a longer processing time.

In the first embodiment, a data processing apparatus which solves the foregoing problems is described.

Figure 1:
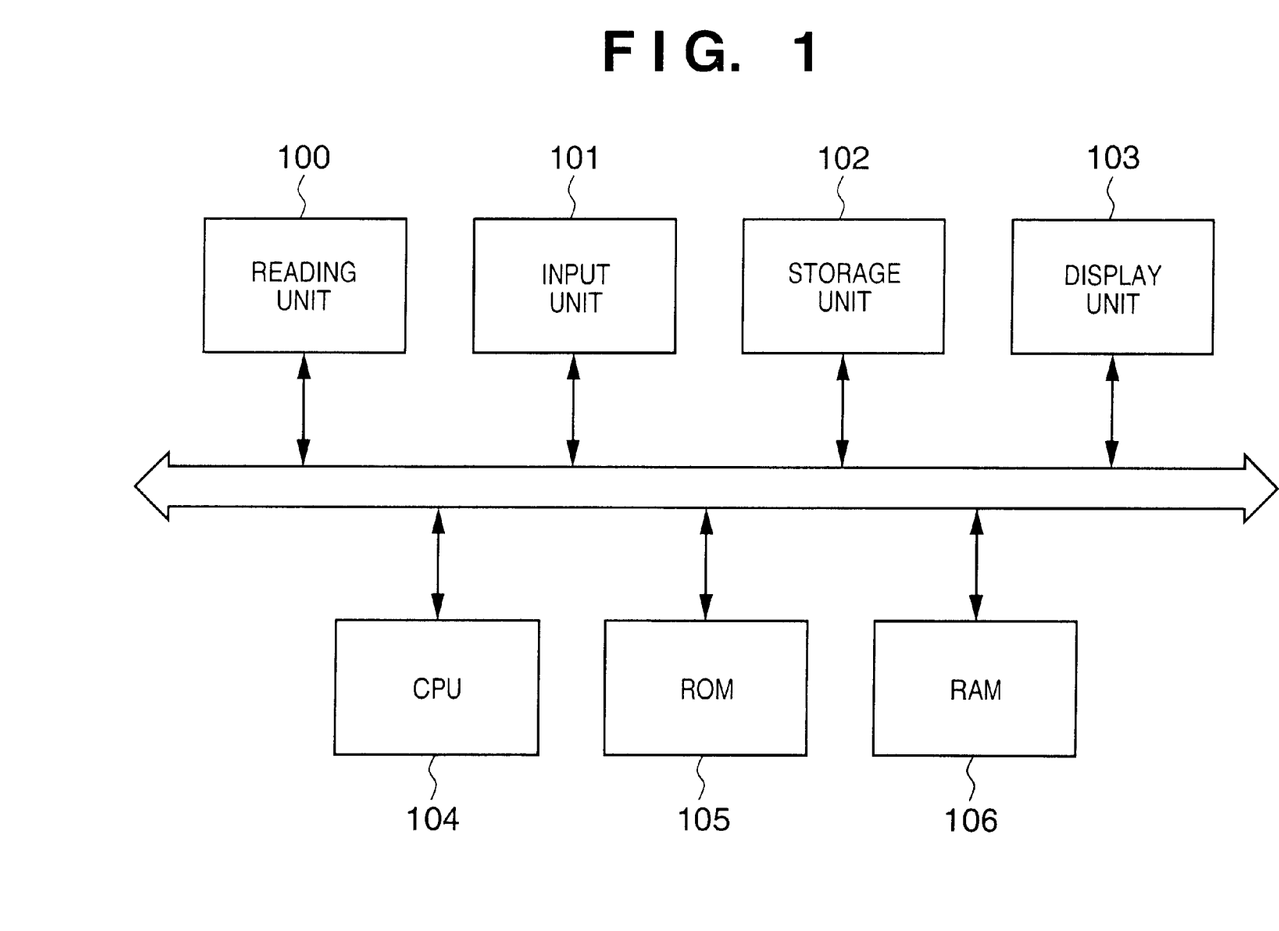
FIG. 1 is a block diagram showing a construction of a data processing apparatus according to a first embodiment of the present invention.

FIG. 1 is a block diagram showing a construction of a data processing apparatus according to the first embodiment. Referring to FIG. 1, reference numeral 100 denotes a reading unit for reading an image by a scanner or the like. Reference numeral 101 denotes an input unit for inputting a user instruction or data, and includes a keyboard or pointing device or the like. Reference numeral 102 denotes a storage unit where binary data or meta-data are stored. Hard disk is generally used as the storage unit 102. Reference numeral 103 denotes a display unit for displaying binary data stored in the storage unit 102 or image data read by the reading unit 100. A CRT or liquid crystal display device or the like is generally used as the display unit 103.

Figure 3:
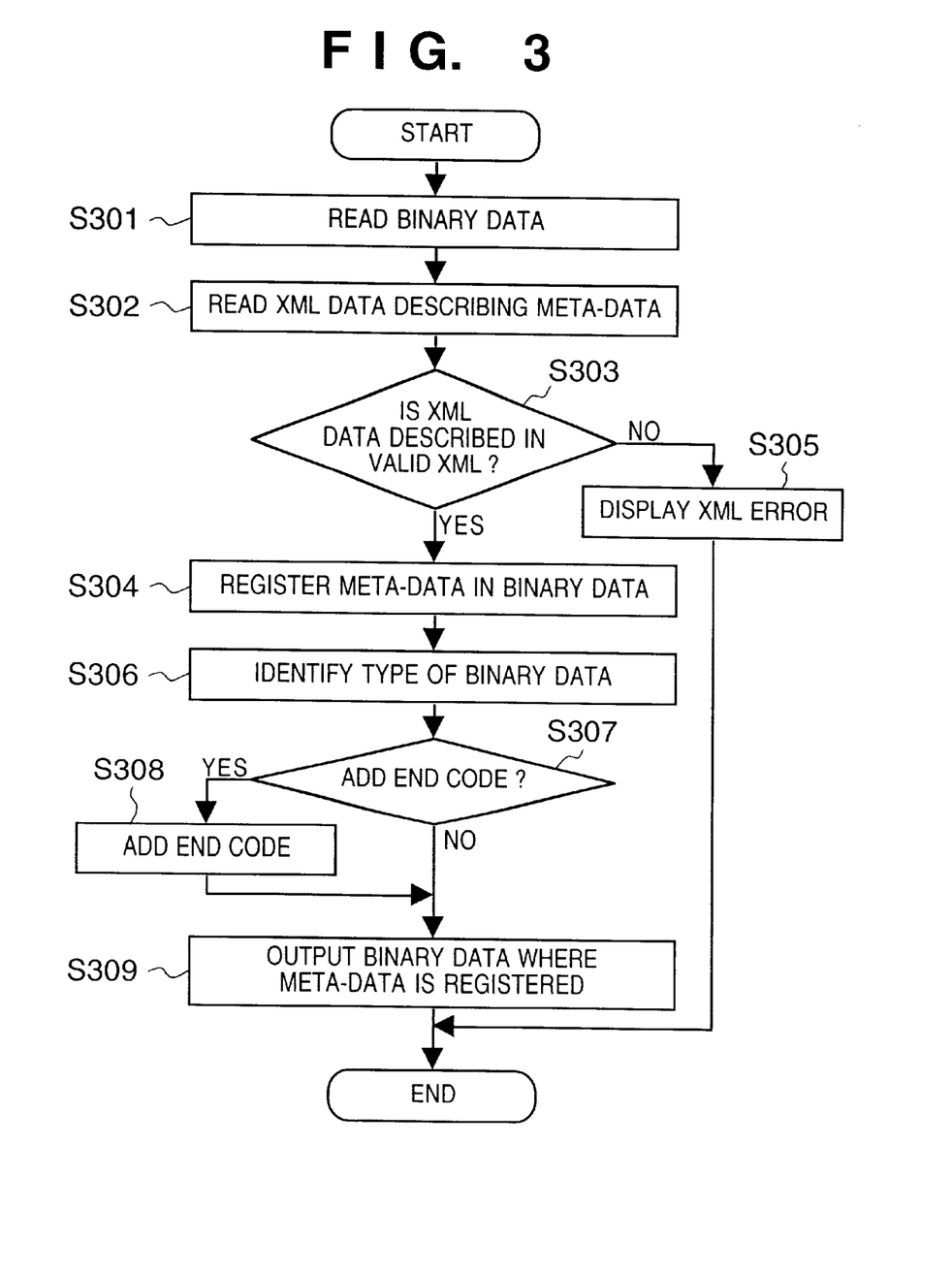
FIG. 3 is a flowchart showing registration processing of meta-data according to the first embodiment.

Reference numeral 104 denotes a CPU associated with all processing of each of the above-described units. ROM 105 and RAM 106 provide areas for storing programs and data necessary for the processing, or provide the CPU 104 with a work area. A control program for the processing steps according to the first embodiment, which will be described later with reference to FIG. 3, is also stored in the ROM 105. Alternatively, the control program may be stored in the storage unit 102 and loaded to the RAM 106 when the CPU 104 executes the control program.

Note that besides the above-described components, various other components are included in the data processing apparatus according to the first embodiment. However, since they are not mainly related to the object of the present invention, description thereof will be omitted.

Next, the process of registering meta-data in binary data by the data processing apparatus having the above-described configuration is described. FIG. 3 is a flowchart showing registration processing of meta-data according to the first embodiment.

In step S301 in FIG. 3, binary data designated by a user is loaded to the memory (RAM 106). For instance, by inputting the name of a desired binary data file from a keyboard, or by designating an icon of the binary data file with a pointing device (e.g., mouse), the binary data stored in the storage unit 102 is loaded to the RAM 106. Note that the binary data stored in the storage unit 102 may be the data downloaded via the Internet, or may be the image data read by the reading unit 100. Next in step S302, an XML file where meta-data is described is loaded to the memory (RAM 106). The designation of the XML file is also realized by inputting the name of the file from a keyboard or designating an icon with a pointing device (e.g., mouse).

In step S303, it is determined whether or not the XML file, where meta-data is described, is in an appropriate form of XML data. To determine the appropriate form of XML data, whether or not the correct description format of the XML file is satisfied is determined (for instance, whether or not the left and right parentheses of a tag are in a correct pair, whether or not the form of the tag is correct and so on). The determination of the appropriate form of XML data may also include determination of a valid form of XML data. To determine the valid form of XML data, whether or not the XML data is described according to a schema, such as Document Type Definition (DTD) or the like, is determined.

If it is determined in step S303 that the XML file is not described in an appropriate form of XML data, the control proceeds to step S305. In step S305, an error in the XML data is displayed in the display unit 103 and the processing ends.

Meanwhile, if it is determined in step S303 that the XML file is described in an appropriate form of XML data, the control proceeds to step S304. In step S304, the meta-data is attached behind the binary data loaded to the memory in step S301, thereby registering the meta-data.

In step S306, the type of binary data (loaded in step S301) is determined. For instance, whether the binary data is JPEG-coded data or MPEG1-coded data is determined. Based on the result of this determination, whether or not an end code of binary data is to be added to the end of meta-data, attached and registered in step S304, is decided in step S307. This decision is made by determining whether or not the binary data includes an end code, for instance, based upon the specification of the image-data file format. More specifically, if the binary data includes an end code, an end code is added in step S308 and the control proceeds to step S309. If it is determined that an end code is not to be added, the control proceeds from step S307 to step S309.

Note that in step S306, the type of binary data may be determined by referring to a file extension (e.g., if the extension is "jpg", the file is a JPEG file, and if the extension is "mpg", the file is an MPEG file). Furthermore, the determination of existence of an end code in step S307 and addition of an end code in step S308 may be performed by referring to a table indicating correspondences between the type of files and end codes, which is stored in the storage unit 102 or ROM 105. For instance, the table includes the correspondence between a JPEG file and its end code EOI, or the correspondence between an MPEG file and its end code SEC. For the type of binary data not registered in the table, determination is made that an end code does not exist.

In step S309, the binary data, in which meta-data is attached and registered (in the case the control advances to step S308, meta-data and end code are attached), is outputted, and then the processing ends. As a result of the data output in step S309, data having a data structure shown in FIG. 4 is stored as a single file in the storage unit 102.

Note that the end code according to the first embodiment is, in the case the binary data is coded by the JPEG coding scheme, an EOI code, and in the case the binary data is coded by the MPEG1 coding scheme, an SEC code. Further, in a case where an end code is not included in the binary-data file format, a code indicative of an end is not attached to the end of meta-data.

As has been described above, according to the first embodiment, by attaching meta-data, described in XML, to the end of binary data, it is possible to register meta-data in existing binary data.

Figure 4:
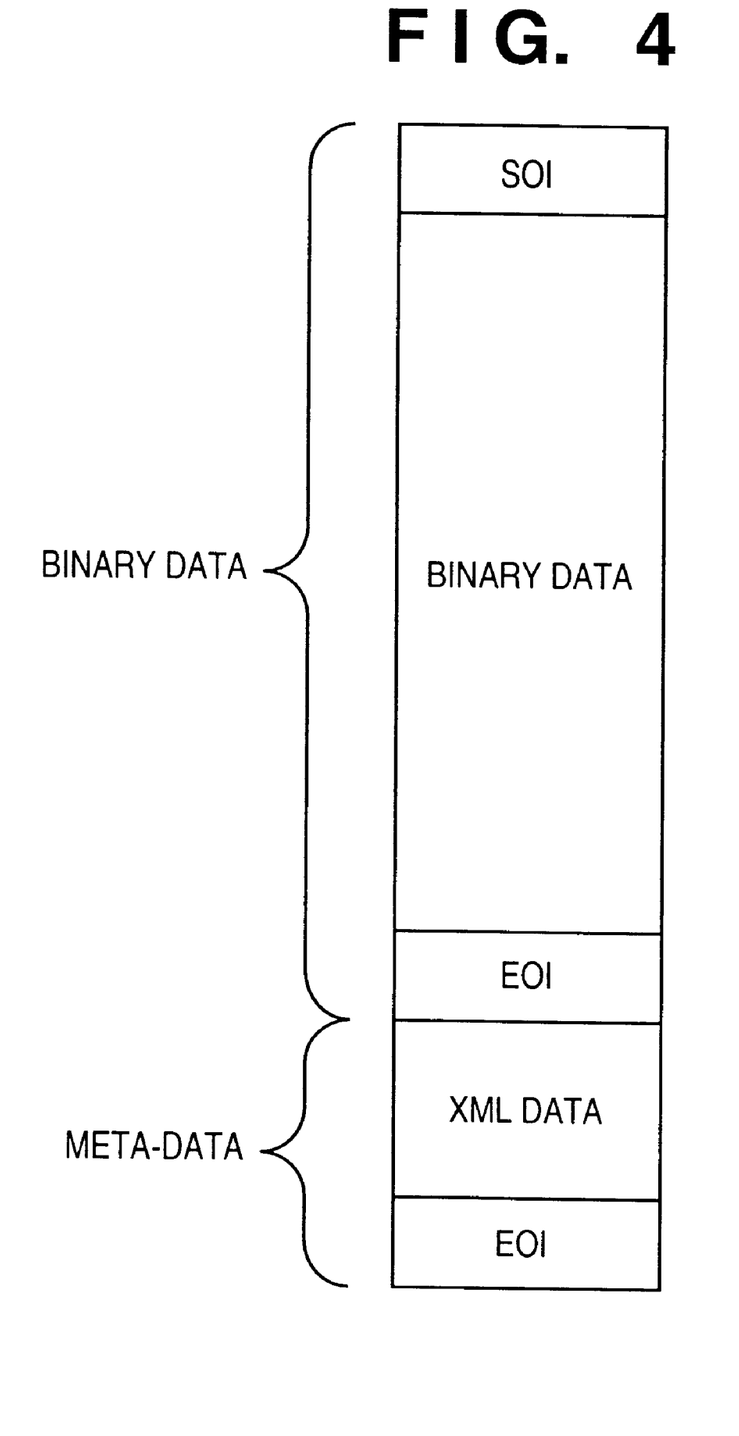
FIG. 4 is an explanatory view in which meta-data is registered in binary data according to the first embodiment.

FIG. 4 is an explanatory view in which meta-data is registered in binary data according to the first embodiment. As shown in FIG. 4, meta-data described in XML is attached to the end of binary data, and a predetermined code is further added to the end of the meta-data. By virtue of this, meta-data can be registered in existing binary data without influencing an existing application program. In other words, binary data, where meta-data is registered, can be provided in the form processible by the existing application program. For instance, in the case of performing processing by retrieving an EOI code in FIG. 4, an EOI code can be accurately detected and correct processing can be performed.

Furthermore, since an existing data description language is used for meta-data, an existing tool for the data description language can be employed in editing or referring to the meta-data. Therefore, the trouble of developing a new tool can be saved.

For instance, the meta-data is described in XML in the first embodiment. Once the XML data portion is extracted, addition, modification, and reference of the meta-data can be realized by a tool comprehensive of XML data. Therefore, the first embodiment is extremely versatile. Note that the extraction of the XML data portion will be described in detail in the second embodiment.

Second Embodiment

The first embodiment has described a case where an end code of binary data is added to the end of meta-data, which is attached behind the binary data, according to the format of the binary data. The second embodiment describes a case where an image-data file format to be supported is set in advance by the data processing apparatus of the present invention, and all the end codes necessary for supporting the image-data file format are added to the end of the meta-data.

Figure 8:
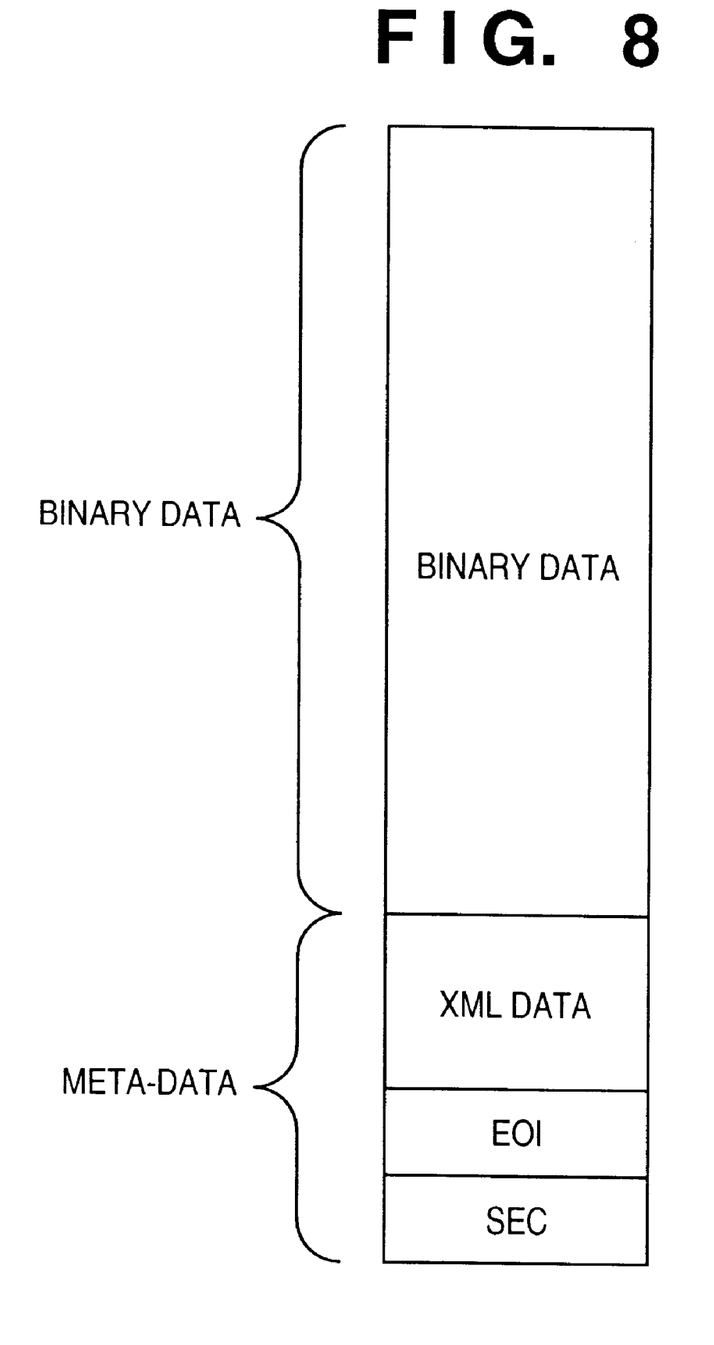
FIG. 8 shows a data structure of binary data to which meta-data is attached and registered according to the second embodiment.

For instance, to support image-data file formats of JPEG and MPEG1, an EOI code for the JPEG and SEC code for the MPEG1 are both added to the end of the meta-data. FIG. 8 shows a data structure of binary data to which meta-data is attached and registered according to the second embodiment. In FIG. 8, the EOI code serving as an end code of the JPEG scheme, and SEC code serving as an end code of the MPEG1 scheme are attached. Needless to say, the sequence of the end-code attachment is not limited to the sequence shown in FIG. 8. Furthermore, the binary-data format subjected to meta-data registration is not limited to JPEG or MPEG format, but binary data in other formats may be subjected to the above processing.

Note that according to the second embodiment, the meta-data registration processing is realized by omitting steps S306 and S307 in the flowchart of FIG. 3, but unconditionally executing step S308. Then in step S308, an end code of the supporting data format is added as described above. Therefore, it is possible to eliminate the processing of determining the binary-data format in step S306 and processing of determining existence of an end code or specifying an end code to be added in step S307 described in the first embodiment. Accordingly, processing speed can be increased.

Third Embodiment

The first and second embodiments have described the method of registering meta-data in binary data. In the third embodiment, whether or not meta-data is registered in binary data is determined, and if registered, the meta-data is extracted. Since the construction of the data processing apparatus according to the third embodiment is the same as that of the first embodiment (FIG. 1), detailed description will not be provided herein.

Figure 5:
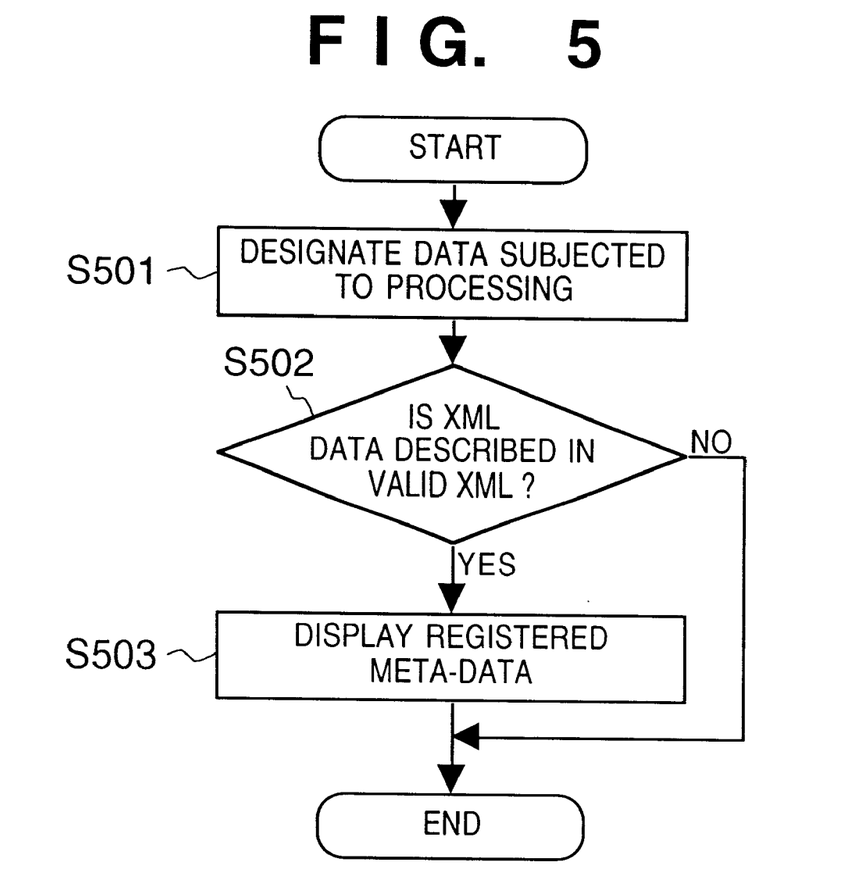
FIG. 5 is a flowchart showing steps of determining and extracting registered meta-data according to a third embodiment of the present invention.

Described hereinafter is an operation of determining whether or not meta-data is registered in the data of a designated file as explained in the first and second embodiments and operation of extracting the registered meta-data. FIG. 5 is a flowchart showing the steps of determining and extracting registered meta-data according to the third embodiment. Note although the third embodiment displays the extracted meta-data in the display unit 103, the form of output is not limited to this. For instance, it is apparent to those who are skilled in the art that the extracted meta-data may be supplied to retrieving process.

In step S501 in FIG. 5, a file subjected to determination of whether or not meta-data is registered, i.e., data subjected to processing, is designated according to a user's instruction. The designation of data subjected to processing in step S501 is realized by inputting a file name of the binary data from a keyboard or designating a corresponding icon with a pointing device (mouse).

Figure 6:
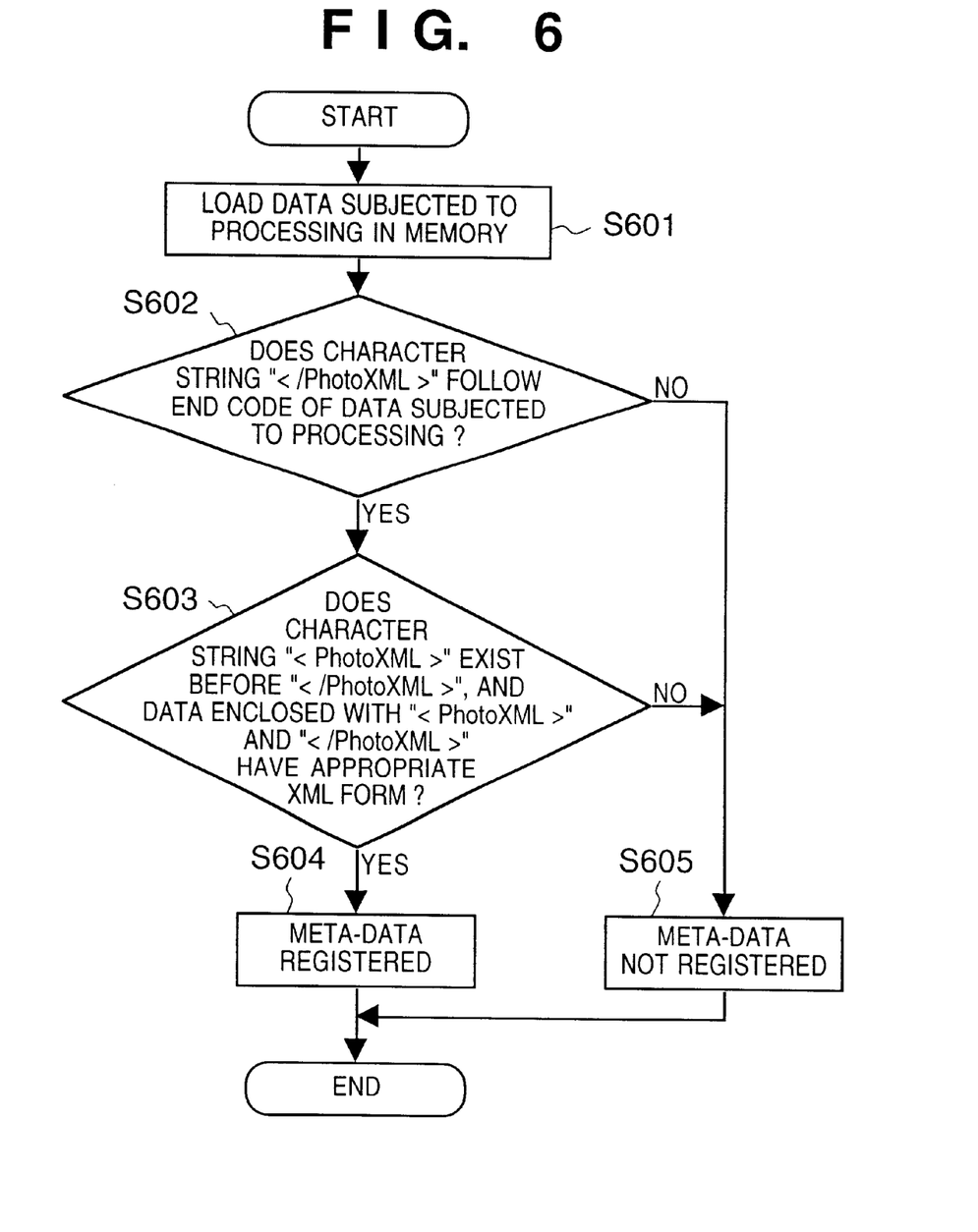
FIG. 6 is a flowchart showing details of meta-data determination processing according to the third embodiment.
Figure 7:
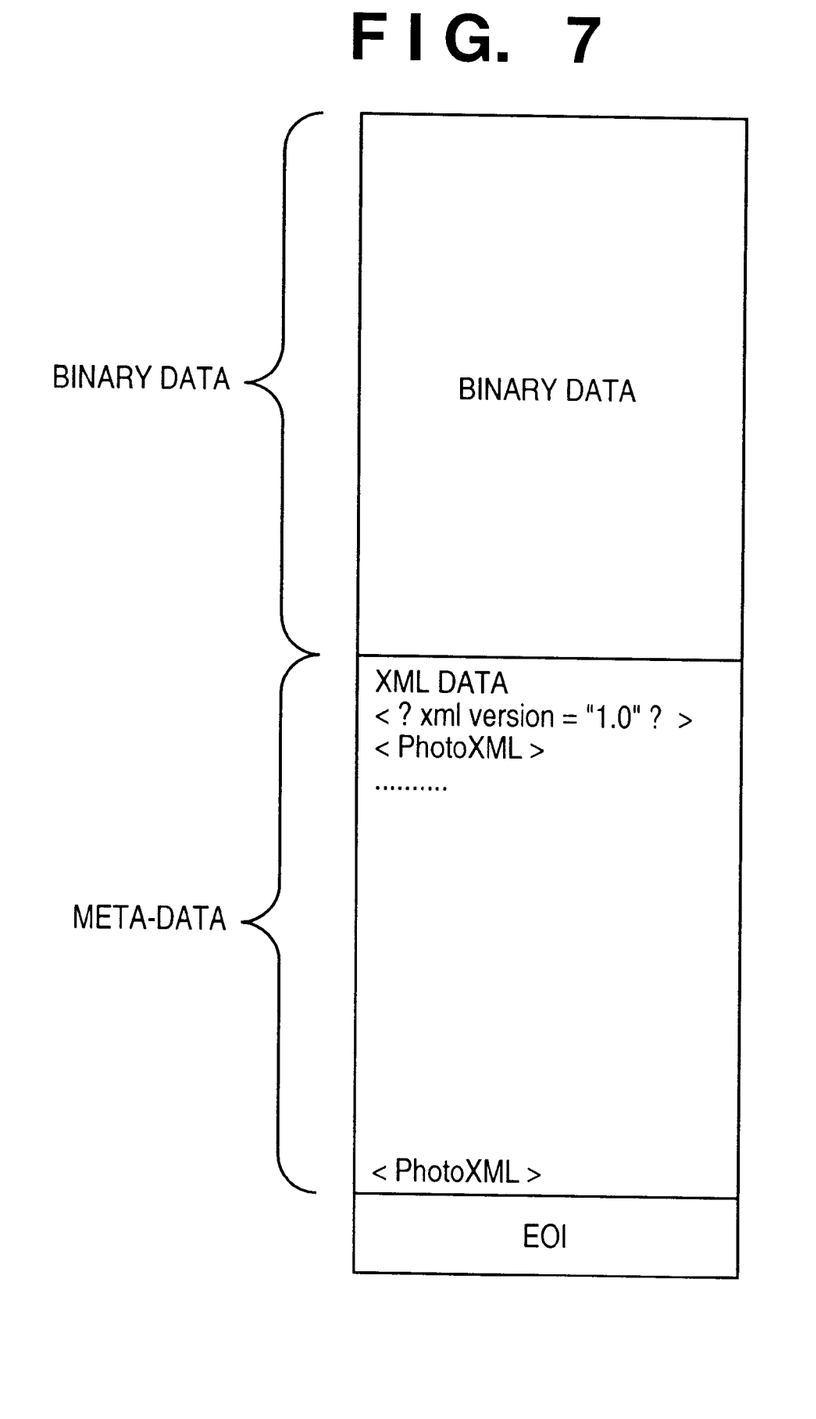
FIG. 7 shows a data structure of binary data where XML data is registered as meta-data.

In step S502, it is determined whether or not meta-data, described in XML, is registered in the designated file data. Hereinafter, details of the determination processing in step S502 are described with reference to the flowchart in FIG. 6 and brief data-structure view in FIG. 7. FIG. 6 is a flowchart showing details of meta-data determination processing according to the third embodiment. FIG. 7 shows a data structure of binary data where XML data is registered as meta-data.

As described in the first embodiment, data subjected to processing, in which XML data is registered as meta-data, has the configuration shown in FIG. 7. Therefore, determination of whether or not meta-data exists is made in the following manner.

As shown in FIG. 6, first in step S601, the entire data of the file (data subjected to processing), designated in step S501, is loaded to the memory (RAM 106). Note since the data outputted in step S306 (FIG. 3) of the first embodiment is managed as a single file, it is possible to read the entire data by a general file management system.

In step S602, it is determined whether or not the end code of the data loaded in step S601 is followed by a character string "</PhotoXML>". If not, the control proceeds to step S605.

If the end code of the loaded data subjected to processing is followed by the character string "</PhotoXML>", the control proceeds to step S603. In step S603, it is determined whether or not a character string "<PhotoXML>" exists before the character string "</PhotoXML>". Furthermore, it is determined whether or not data enclosed with the "</PhotoXML>" and "<PhotoXML>" is described in an appropriate XML form. Note that whether or not the XML data is in a valid form may also be determined herein. Determination of appropriate form of XML data and valid form of XML data is performed as described in the first embodiment (step S303).

When it is determined that the data has an appropriate form in step S603, the control proceeds to step S604. In step S604, it is decided that meta-data is registered, and the processing ends. Meanwhile, when it is determined that the data does not have an appropriate form in step S603, the control proceeds to step S605. In step S605, it is decided that meta-data is not registered. More specifically, when the character string "</PhotoXML>" does not exist at the end of the binary data in step S602 or when the character string "<PhotoXML>" does not exist in step S603 or when it is determined that the data is not described in an appropriate XML form in step S603, the control proceeds to step S605, and it is decided that meta-data is not registered in the data subjected to processing.

Then, the determination processing of whether or not meta-data exists ends.

Next, the flowchart in FIG. 5 is referred to again. When it is decided by the processing shown in the flowchart in FIG. 6 that meta-data is registered, the control proceeds to step S503. In step S503, contents of the registered meta-data are displayed based on the XML data enclosed with the character strings "<PhotoXML>" and "</PhotoXML>", and the processing ends. Meanwhile, if it is decided in step S502 that meta-data is not registered, the processing ends without further processing.

As has been described above, according to the third embodiment, binary data having meta-data can be distinguished from ordinary binary data by determining whether or not XML data is described in an appropriate form at the end of the binary data. Furthermore, when meta-data is found, the meta-data can be displayed.

In other words, according to the third embodiment, binary data where meta-data is registered can be distinguished from binary data where meta-data is not registered, and the registered meta-data can be extracted. By describing meta-data in an existing data description language, an existing tool for the data description language can be used without modification when performing data retrieval using meta-data. Thus, the trouble of developing a new tool can be saved.

Note in each of the foregoing embodiments, although XML data is employed as meta-data, meta-data is not limited to this. For instance, meta-data may be described in other data description languages, e.g., Standard Generalized Markup Language (SGML), Hypertext Markup Language (HTML) and so on. Furthermore, binary data may be still image data, motion image data, audio data and so on.

Note although the third embodiment has described that the processing is performed on the data (FIG. 7) obtained by the steps according to the first embodiment, the processing may be performed on the data (FIG. 8) obtained by the steps according to the second embodiment. In this case, plural end codes (two in the second embodiment) are found in step S602.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been set forth above, according to the present invention, by describing meta-data in a data-description language and attaching the meta-data to the end of binary data, it is possible to register meta-data in existing binary data.

Furthermore, it is possible to distinguish binary data where meta-data is registered from ordinary binary data. Moreover, when performing registration or retrieval of meta-data, an existing tool for a general data description language can be employed without modification. Therefore, the trouble of developing a new tool can be saved.

Further, by adding an end code of binary data to the meta-data, determination of binary data completion can be quickly made.

As many apparently widely different embodiments of the present invention can be made without departing from the spirit and scope thereof, it is to be understood that the invention is not limited to the specific embodiments thereof except as defined in the claims.

What is claimed is:

1. A data processing method of adding meta-data to binary data, comprising:
   a first reading step of reading binary data to which meta-data is to be added;
   a second reading step of reading meta-data to be added to the binary data;
   a first attaching step of attaching the meta-data, read in said second reading step, behind the binary data read in said first reading step, wherein the binary data may include its own end code;
   a determination step of determining whether or not the binary data has an end code;
   a second attaching step of attaching an end code, corresponding to the binary data, behind the meta-data attached in said first attaching step; and
   an output step of outputting entire data, obtained by said first and second attaching steps, as a single file,
   wherein if it is determined in said determination step that the binary data has an end code, in said second attaching step the end code corresponding to the binary data is attached behind the meta-data, which is attached in said first attaching step.

2. The method according to claim 1, wherein in said second attaching step, a predetermined end code is attached behind the meta-data attached in said first attaching step.

3. The method according to claim 1, wherein in said second attaching step, plural types of predetermined end codes are attached behind the meta-data attached in said first attaching step.

4. The method according to claim 1, further comprising a determination step of determining whether or not the meta-data, read in said second reading step, is described in an appropriate form of a predetermined data description language,
   wherein if it is determined in said determination step that the meta-data is described in an appropriate form, in said first attaching step, the meta-data is attached behind the binary data.

5. The method according to claim 4, wherein in said determination step, whether or not the meta-data satisfies validity of the predetermined data description language is determined.

6. The method according to claim 1, wherein said binary data is image data.

7. The method according to claim 1, wherein said binary data is audio data.

8. The method according to claim 1, wherein said binary data is motion image data.

9. The method according to claim 1, wherein said predetermined data description language is XML.

10. The method according to claim 1, wherein said predetermined data description language is SGML.

11. The method according to claim 1, wherein said predetermined data description language is HTML.

12. A data processing apparatus for adding meta-data to binary data, comprising:
    first reading means for reading binary data to which meta-data is to be attached;
    second reading means for reading meta-data to be attached to the binary data;
    first attaching means for attaching the meta-data, read by said second reading means, behind the binary data read by said first reading means, wherein the binary data may include its own end code;
    determination means for determining whether or not the binary data has an end code;
    second attaching means for attaching an end code, corresponding to the binary data, behind the meta-data attached by said first attaching means; and
    output means for outputting entire data, obtained by said first and second attaching means, as a single file,
    wherein if said determination means determines that the binary data has an end code, said second attaching means attaches the end code corresponding to the binary data behind the meta-data, which is attached by said first attaching means.

13. The apparatus according to claim 12, wherein said second attaching means attaches a predetermined end code behind the meta-data attached by said first attaching means.

14. The apparatus according to claim 12, wherein said second attaching means attaches plural types of predetermined end codes behind the meta-data attached by said first attaching means.

15. The apparatus according to claim 12, further comprising determination means for determining whether or not the meta-data, read by said second reading means, is described in an appropriate form of a predetermined data description language, wherein if said determination means determines that the meta-data is described in an appropriate form, said first attaching means attaches the meta-data behind the binary data.

16. The apparatus according to claim 15, wherein said determination means determines whether or not the meta-data satisfies validity of the predetermined data description language.

17. A storage medium storing a control program for having a computer realize data processing of adding meta-data to binary data, said control program comprising:

code means for a first reading step of reading binary data to which meta-data is to be attached;

code means for a second reading step of reading meta-data to be attached to the binary data;

code means for a first attaching step of attaching the meta-data, read in said second reading step, behind the binary data read in said first reading step, wherein the binary data may include its own end code;

code means for a determination step of determining whether or not the binary data has an end code;

code means for a second attaching step of attaching an end code, corresponding to the binary data, behind the meta-data attached in said first attaching step; and code means for an output step of outputting entire data, obtained by said first and second attaching steps, as a single file, wherein if it is determined in said determination step that the binary data has an end code, in said second attaching step the end code corresponding to the binary data is attached behind the meta-data which is attached in said first attaching step.

18. A control program for having a computer realize data processing of registering meta-data in binary data, said control program comprising:

code means for a first reading step of reading binary data to which meta-data is to be attached;

code means for a second reading step of reading meta-data to be attached to the binary data;

code means for a first attaching step of attaching the meta-data, read in said second reading step, behind the binary data read in said first reading step, wherein the binary data may include its own end code;

code means for a determination step of determining whether or not the binary data has an end code;

code means for a second attaching step of attaching an end code, corresponding to the binary data, behind the meta-data attached in said first attaching step; and code means for an output step of outputting entire data, obtained by said first and second attaching step, as a single file, wherein if it is determined in said determination step that the binary data has an end code, in said second attaching step the end code corresponding to the binary data is attached behind the meta-data which is attached in said first attaching step.

* * * * *